United States Patent Office 3,510,463
Patented May 5, 1970

3,510,463
SUSPENSION ALCOHOLYSIS OF PELLETED ETHYLENE/VINYL ESTER COPOLYMERS
John Edwin Bristol, Niagara Falls, N.Y., assignor to E. I. du Pont de Nemours and Company, Wilmington, Del., a corporation of Delaware
No Drawing. Continuation-in-part of application Ser. No. 605,999, Dec. 30, 1966. This application Nov. 20, 1967, Ser. No. 684,475
Int. Cl. C08f 27/14
U.S. Cl. 260—87.3    11 Claims

ABSTRACT OF THE DISCLOSURE

Alcoholysis of an alcohol-insoluble copolymer of ethylene and vinyl acetate is accomplished by suspending the copolymer, in pelleted form, in a liquid medium of methanol, alcoholysis catalyst, and alcohol-miscible copolymer swelling agent, such as benzene or methylene chloride.

RELATION TO OTHER APPLICATIONS

This application is a continuation-in-part of application U.S. Ser. No. 605,999, filed Dec. 30, 1966.

BACKGROUND OF THE INVENTION

This invention relates to suspension alcoholysis of copolymers containing alcoholizable moieties and particularly to methods of swelling the suspended copolymers in order to improve the alcoholysis rate.

In general, bulk ethylene/vinyl ester copolymers are commercially available in the form of pellets. The pellets are usually homogeneous in composition, i.e., the copolymer molecules making up the pellets do not vary in composition by more than aobut 1 or 2 percent. In the production of ethylene/vinyl alcohol copolymers from such ethylene/vinyl ester copolymer pellets, suspension alcoholysis methods, as contrasted with solution alcoholysis techniques such as taught by Roland, U.S. Pat. 2,386,347 issued Oct. 9, 1945 and Bestian et al., U.S. Pat. 3,344,129 issued Sept. 26, 1967, would be advantageous for a variety of reasons. The retention of the pelleted form of the original ethylene/vinyl ester copolymer reactant in the ethylene/vinyl alcohol product would facilitate filtration, washing, and drying as well as providing a product in a dustless and desirable form for packaging and handling. Consequetly, a method whereby ethylene/vinyl ester copolymers could be suspension alcoholyzed to yield alcoholyzed pellets would be very desirable.

SUMMARY OF THE INVENTION

The present invention provides a process for the rapid suspension alcoholysis of precursor pelleted ethylene/vinyl ester copolymers made up of molecules containing at least about 82 mole percent ethylene and the alcoholyzed pellets themselves. The process basically comprises suspending the prescursor ethylene/vinyl ester copolymer pellets at a temperature of at least 25° C. in an alcohol reaction medium consisting essentially of a lower alcohol reactant, an alcohol-miscible non-reactive copolmer swelling agent, and an alcoholysis catalyst and maintaining the copolymer in suspension until the desired degree of alcoholysis is accomplished. By this suspension alcoholysis process, alcoholyzed copolymer pellets can be prepared with degrees of alcoholysis of from less than 1 mole percent to substantially complete.

DESCRIPTION OF THE INVENTION

Ethylene/vinyl ester copolymer pellets suitable for suspension alcoholysis according to this invention are those which do not ordinarily swell or dissolve in lower alcohols at temperatures of about 30–60° C. and which, heretofore, have been alcoholyzed in solution at elevated temperatures. Also, the copolymer pellets must be suspendible in the present reaction medium and not dissolve therein at the desired alcoholysis temperature. As a general rule, the solubility of the ethylene/vinyl ester copolymer pellets in the reaction medium increases with an increase in the copolymerized vinyl ester monomer content of the molecules making up the pellets. Pellets of copolymer molecules containing less than about 82 mole percent ethylene are usually soluble in the present reaction medium at temperatures of about 25° C. Since, even using the process of this invention, long alcoholysis reaction times are required at temperatures below about 25° C., a usual criteria of copolymer pellets in this invention is that they be made up of copolymer molecules having at least about 82 mole percent polymerized ethylene and, correspondingly, do not dissolve at about 25° C. While, to keep the copolymer pellets in suspension, the initial reaction temperature for a copolymer having about 82 mole percent ethylene content is generally about 25–30° C., the temperature can be raised as alcoholysis proceeds since the copolymer ester content is being concurrently diminished. As the ethylene content of the copolymer molecules in a pellet is increased above about 82 mole percent, the pellet's solubility in the reaction medium diminishes, and alcoholysis can be initiated at a higher temperature, e.g., 40–45° C. for copolymers containing 90 percent ethylene and above. Of course, the maximum initial reaction temperature for a particular copolymer pellet is the highest temperature at which the pelleted form of the copolymer can be maintained.

Pellets of ethylene/vinyl ester copolymer molecules containing about 82–99 mole percent ethylene are useful in the present invention. However, particular advantages are obtained when the copolymer has more than about 89 percent ethylene. Not only is the pelleted form maintained but, due to the fact that alcoholysis can be initiated at temperatures above about 30° C., unexpectedly fast reaction rates are observed as well. Particular use is found with copolymers containing about 89–94 percent copolymerized ethylene and 6–11 percent copolymerized vinyl ester.

Useful methods of preparing ethylene/vinyl ester copolymers are described in Roedel, U.S. Pat. 2,703,794 and Perrin, U.S. Pat. 2,200,429. While these methods are of the free radical type, copolymers prepared by other processes, such as by using ionic or Ziegler type catalysts, can also be used. According to commercial practice, after polymerization the copolymer is pelleted by any of the known polymer cutting techniques, such as strand cutting, melt cutting, dicing, etc. Depending on the particular cutting technique, the pellets can be of various shapes, such as spherical, cubical, cylindrical, elipsoidal, etc., and sizes. In general, customary pellet size, by volume, corresponds to that of a sphere having a diameter of about $\frac{1}{16}''-\frac{1}{4}''$. However, neither the pellet size nor shape is especially critical in the present invention and any of the commercially available pellets can be used.

The molecular weight of useful copolymers is not limited and can be as high as one million or more. Of course, ethylene/vinyl ester copolymers with very low molecular weights, such that they are syrupy in nature, do not possess the necessary physical properties, such as tensile strength, which enable their successful preparation or alcoholysis in pelleted form. Using the copolymer melt index as an indication of molecular weight, particularly useful copolymers have melt indexes of less than 1000, and preferably less than 160.

The copolymer melt index is determined as described in ASTM D–1238–65T using Condition E for those copolymers having a melt index below about 75, and using Condition A for those copolymers having a melt index in excess of 75. When Condition A is used, the measured flow rate (grm./10 min.) is converted to the melt index by the following formula:

Melt index=$\log^{-1}$ [0.83 log (flow rate)+1.825]

While vinyl acetate is the most commonly polymerized vinyl ester monomer, almost any other vinyl ester of a saturated organic carboxylic acid can be used so long as it does not sterically hinder the desired alcoholysis reaction. Consequently, monomers such as vinyl palmitate and vinyl stearate can be polymerized with ethylene to form alcoholizable copolymers. However, vinyl esters of lower carboxylic acids (lower vinyl esters) such as vinyl formate, vinyl propionate, and vinyl butyrate are generally preferred in addition to vinyl acetate. In addition to the above-described binary ethylene/vinyl ester copolymers, copolymers containing minor amounts of other copolymerizable ingredients, such as acrylates, methacrylates, and carboxylic acids, such as acrylic or methacrylic, are also useful in the present process.

Also, though the invention has heretofore mentioned only ethylene copolymers, the present process is considered to be applicable to copolymers prepared with a wide variety of mono-olefinic monomers. However, as the olefin chain length increases, difficulty is encountered in preparing copolymers with high enough molecular weights and, consequently, useful vinyl ester copolymers prepared from olefins other than ethylene are not readily available. Therefore, ethylene copolymers are presently the most useful; however, alcoholysis according to this invention is also thought to be possible with copolymers having the desired molecular weight prepared from propylene, 1-butene, 2-butene, 2-methyl-1-butene, etc.

The alcohol reaction medium in the present invention consists essentially of a lower (less than about 5 carbon atoms) mono-hydric alcohol reactant (e.g., methanol, ethanol, or methyl Cellosolve), a copolymer swelling agent, and an alcoholysis catalyst. As used herein, the term "consists essentially of" means that the named ingredients are essential; however, other ingredients which do not detract substantially from the benefits of the process can also be present. For example, when an ethylene-vinyl acetate copolymer is alcoholyzed with methanol, methyl acetate, if not removed, will be increasingly present in the alcohol reacting medium as the reaction progresses. Small traces of water, acetic acid and ingredients from previous processing steps can be present as well. Frequently, the latter ingredients will be derivatives of materials used in prior copolymer processing steps to improve the color of the ethylene/vinyl alcohol product.

Copolymer swelling agents useful in the present invention must be capable of swelling the copolymer particles while not dissolving them at the alcoholysis temperature. Useful swelling agents are miscible and non-reactive with the lower alcohol and catalyst at the alcoholysis temperature and, in general, have a limited solubiity in the particles at the alcoholysis temperature and are a solvent for the particles at an elevated temperature. Useful swelling agents are liquid solvents in classes, such as aromatic hydrocarbons, chlorinated hydrocarbons, aliphatic hydrocarbons, and cyclic ethers. Among others, the following are examples of swelling agents that can be employed: benzene, toluene, xylene, methylene chloride, chloroform, trichlorethylene, perchlorethylene, dioxanes, tetrahydrofuran, petroleum ether, gasoline, mineral spirits, kerosene, etc.

The effectiveness of the present process is not limited to either an acid or alkaline catalyst so long as the swelling agent is non-reactive with it and the catalyst is soluble in the lower alcohol reactant. As with other known alcoholysis processes, an alkaline catalyst, such as sodium hydroxide or sodium methylate is generally used since faster reaction rates are observed than with acid catalysts.

The amount of alcohol reaction medium must be sufficient to suspend the ethylene/vinyl ester copolymer pellets. The lower alcohol reactant is present in an excess amount, generally at least twice and usually much more, of the stoichiometric equivalent required to carry out the alcoholysis. The swelling agent is present in an amount sufficient to swell the particles at least about 20 percent of their original volume and, preferably, at least about double. The volume ratio of the amount of copolymer swelling agent to amount of lower alcohol reactant in the reaction medium is usually about .3:1–4:1. Several factors govern this ratio. As the proportion of swelling agent is increased, the concentration of lower alcohol reactant, and consequently the alcoholysis rate, is decreased. The alcoholysis rate is also decreased if sufficient swelling agent is not present to swell the ethylene/vinyl ester copolymer particles. For copolymers having at least 85 percent polymerized ethylene, an initial ratio of swelling agent to lower alcohol reactant of about 1:1 can generally be used. When the ethylene/vinyl ester copolymer contains less than about 85 percent polymerized ethylene, the use of a lower initial ratio of swelling agent to alcohol reactant is customarily necessary to prevent fusion of the copolymer pellets. A volume ratio of about 1:3 is useful in such cases. The catalyst concentration, based on the combined weight of the lower alcohol reactant and the swelling agent, is not critically limited though it is generally about 0.5–7.0 percent. Especially fast reactions are obtained when more than about 2.5 percent catalyst is used, while for economic reasons, not more than about 7 percent catalyst is used.

The following examples illustrate the invention. All parts and percentages are by weight unless otherwise indicated. The analysis for weight percent vinyl acetate is carried out by dissolving 1.00 grms. of the alcoholyzed copolymer in 50 ml. of xylene and adding to the solution 100 ml. of a 1:1:1 mixture of methanol-xylene-pyridine. Ten ml. of an approximately 2 N solution of sodium hydroxide is then added and the mixture refluxed for four hours after which it is cooled and back-titrated with a 0.500 N solution of toluene sulfonic acid in pyridine. Metacresol purple is used as an indicator. A blank sample, containing no copolymer, is run in a similar fashion. The weight percent vinyl acetate is calculated by using the following formula:

Percent vinyl acetate=[blank titre (ml.)—sample titre (ml.)]×4.3

Example I 30 grams of ethylene (72%)-vinyl acetate (28%) copolymer pellets [1] (89/11 by moles) having a melt index of about 15 are suspended, with continuous stirring, in a vesesl containing 30 ml. of benzene and 30 ml. of a 10% sodium methylate (NaOMe) solution in methanol. The suspension is maintained at 25–27° C. by means of a water bath. Almost immediately the pellets swell to about double their original size and small portions of the reaction mixture containing some pellets are removed after 2 hours and 16 hours. The liquid is decanted from the portions removed, and the pellets are washed thoroughly with methanol, and dried at about 55° C. in a circulating air oven. On drying, the pellets regain their initial size subsequent to which they are analyzed for vinyl acetate content. The pellets removed after 2 hours and 16 hours of reaction show 1.4% and 0.2% of vinyl acetate content, respectively.

Example II 30 grams of ethylene (82%)-vinyl acetate (18%) copolymer pellets [2] (94/6 by moles) having a melt index of about 150 are suspended, with continuous stirring, in a vessel containing 30 ml. of benzene and 30 ml. of a 10% sodium methylate (NaOMe) solution in methanol. The suspension is maintained at 30° C. by means of a water bath. Samples are withdrawn from the mixture and, after ---
[1] Available under the registered trademark of E. I. du Pont de Nemours & Co. as "Elvax" 250.
[2] Available under the registered trademark of E. I. du Pont de Nemours & Co as "Elvax" 420.

decanting, washing, and drying, the pellets are analyzed for vinyl acetate content with the following results:

| Time of reaction (hours): | percent vinyl acetate |
|---|---|
| 2 | 12.5 |
| 4 | 5.9 |
| 8 | 3.7 |
| 24 | 2.3 |

On repeating Example II at an alcoholysis temperature of 42° C., pellet suspension is maintained and a faster alcoholysis rate is observed.

Example III 4.0 lbs. of ethylene (72%)-vinyl acetate (28%) copolymer pellets [1] having a melt index of about 15 are added to a solution of 0.20 lb. of NaOMe in 2 liters of methanol. While stirring the mixture at 30° C., 1.35 liters of methylene chloride are added, and the mixture is held, without agitation, at 30° C. Samples are withdrawn from the mixture and, after decanting, washing, and drying, the pellets are analyzed for vinyl acetate content with the following results:

| Time of reaction (hours): | Percent vinyl acetate |
|---|---|
| 2 | 24 |
| 4 | 16 |
| 8 | 12 |
| 23 | 3.9 |

Example IV

The same procedure illustrated in Example II is carried out with the exception of the particular polyvinyl ester copolymer pellets which, in this example, are ethylene (67%)-vinyl acetate (33%) copolymer pellets [3] (86/14 by moles) having a melt index of about 25. The results of the analyses for vinyl acetate content are:

| Time of reaction (hours): | Percent vinyl acetate |
|---|---|
| 2 | 26 |
| 4 | 14.1 |
| 8 | 7.4 |
| 23 | 4.6 |

Example V

The same procedure illustrated in Examples III and IV is carried out with the exception of the particular ethylene/vinyl ester copolymer pellets and the amount of methylene chloride. In this example, the pellets are ethylene (60%)-vinyl acetate (40%) copolymer pellets [4] (82/18 by moles) having a melt index of about 40 and only 680 ml. of methylene chloride are used. The results of the analyses for vinyl acetate content are:

| Time of reaction (hours): | Percent vinyl acetate |
|---|---|
| 2 | 28.7 |
| 4 | 16.4 |
| 8 | 7.6 |
| 23 | 5.7 |

As is evident from the above discussion and examples, by varying reaction conditions and ingredients, a variety of alcoholyzed copolymers can be prepared. Additionally, by continuously removing by-products formed during alcoholysis, e.g., methyl acetate, the reaction rate and ultimate percent residual vinyl ester can be influenced. In general, the desired ethylene content and degree of alcoholysis of a copolymer will be established by the particular end use for which it is intended. As is well known, there are a variety of different uses, e.g., adhesives, fibers, etc., for completely or partially alcoholyzed ethylene/vinyl ester copolymers and compositions thereof. The partially or completely alcoholyzed pellets of the present invention are useful in any of these applications.

While the above examples have illustrated the degree of alcoholysis in terms of the weight percent of residual vinyl ester in the alcoholyzed copolymer, the degree of alcoholysis can also be expressed as the average mole percent of vinyl ester groups converted by alcoholysis to vinyl alcohol groups, based on the number of moles of vinyl ester groups initially present in the precursor ethylene/vinyl ester copolymer. This mole percent of alcoholysis is obtained by converting, by means of an appropriate mathematically constructed calibration for the particular ethylene/vinyl ester copolymer, the calculated aforementioned weight percent residual vinyl ester (VE) content ot the corresponding mole percent residual vinyl ester (VE) content in the alcoholyzed copolymer, and applying the following formula:

Mole percent alcoholysis=

$$\left[\frac{\text{Mole percent } VE \text{ (initial)} - \text{mole percent } VE \text{ (final)}}{\text{mole percent } VE \text{ (initial)}}\right]$$

Using the present process, alcoholyzed ethylene/vinyl ester copolymer pellets can be prepared with degree of alcoholysis of from less than 1 mole percent to substantially complete, i.e., 95–100 mole percent. In general, the present process is most applicable in preparing useful alcoholyzed copolymer pellets having a degree of alcoholysis of at least 15 mole percent. As used in this invention, the degree of alcoholysis refers to the average degree of alcoholysis of the molecules in the copolymer pellet. However, pellets alcoholyzed by the present process are substantially homogeneous in the degree of alcoholysis, i.e., the predominant portion (greater than about 90 percent) of the molecules of a copolymer pellet having a given average degree of alcoholysis do not individually vary from the average by more than about ±5 mole percent.

I claim:

1. The process of alcoholyzing ethylene/vinyl ester copolymer pellets having a melt index of less than 1000 and containing ethylene/vinyl ester molecules having at least 82 mole percent ethylene comprising suspending the copolymer pellets at a temperature of at least about 25° C. in an alcohol reaction medium consisting essentially of (a) mono-hydric lower alcohol reactant having less than about 5 carbon atoms, (b) an alcohol-miscible non-reactive copolymer swelling agent selected from the group consisting essentially of aromatic hydrocarbons, chlorinated hydrocarbons, aliphatic hydrocarbons, and cyclic ethers, and (c) an alcoholysis catalyst and maintaining the copolymer in suspension in the reaction medium until the desired degree of alcoholysis is accomplished; said component (a) being present in at least the stoichiometric amount necessary to accomplish the desired alcoholysis, and said component (b) being present in an amount sufficient to swell the copolymer at least 20 percent, the volume ratio of (a) to (b) being about .3:1 to 4:1.

2. The process of claim 1 wherein the alcohol-miscible swelling agent is methylene chloride or benzene.

3. The process of claim 2 wherein the vinyl ester is vinyl acetate.

4. The process of claim 3 wherein the lower alcohol reactant is methanol and the catalyst is basic.

5. The process of claim 4 wherein (a) is present in at least twice the stoichiometric amount necessary to accomplish alcoholysis.

6. The process of claim 1 wherein the ethylene/vinyl ester copolymer molecules contain about 6–11 mole percent copolymerized vinyl ester and 89–94 mole percent copolymerized ethylene.

7. The process of claim 6 wherein the vinyl ester is vinyl acetate.

8. The process of claim 7 wherein (a) is present in at least twice the stoichiometric amount necessary to accomplish alcoholysis.

9. The process of claim 8 wherein the alcohol-miscible swelling agent is methylene chloride or benzene.

10. The process of claim 9 wherein the lower alcohol reactant is methanol and the catalyst is basic.

---

[3] Available under the registered trademark of E. I. du Pont deNemours & Co. as "Elvax" 150.

[4] Available under the registered trademark of E. I. du Pont de Nemours & Co. as "Elvax" 40.

11. Th process of claim 10 wherein the basic catalyst is sodium methylate.

References Cited

UNITED STATES PATENTS

| | | |
|---|---|---|
| 2,386,347 | 10/1945 | Roland. |
| 2,399,653 | 5/1946 | Roland _____ 260—86 |
| 2,411,474 | 11/1946 | Stevenson _____ 8—130.1 |
| 2,467,774 | 4/1949 | Plambeck. |
| 2,502,715 | 4/1950 | Germain. |
| 2,605,259 | 7/1952 | Germain. |
| 2,657,201 | 10/1953 | Nebel _____ 260—91.3 |
| 2,703,794 | 3/1955 | Roedel _____ 260—87.3 |
| 3,344,129 | 9/1967 | Bestian. |
| 3,386,978 | 6/1968 | Salyr _____ 260—87.3 |

FOREIGN PATENTS

| | | |
|---|---|---|
| 1,095,204 | 11/1966 | Great Britain. |
| 1,106,489 | 3/1968 | Great Britain. |

JOSEPH L. SCHOFER, Primary Examiner

J. C. HAIGHT, Assistant Examiner

U.S. Cl. X.R.

260—91.3